US007486421B2

(12) United States Patent
Yang

(10) Patent No.: US 7,486,421 B2
(45) Date of Patent: Feb. 3, 2009

(54) MEDIA TRANSFER MECHANISM

(75) Inventor: Kun-Pao Yang, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 984 days.

(21) Appl. No.: 10/918,470

(22) Filed: Aug. 16, 2004

(65) Prior Publication Data

US 2006/0076727 A1 Apr. 13, 2006

(51) Int. Cl.
*H04N 1/04* (2006.01)

(52) U.S. Cl. ........................ 358/474; 358/498; 358/496; 358/497; 271/186; 271/3.14

(58) Field of Classification Search ................. 358/498, 358/497, 494, 496; 271/3.14, 186
See application file for complete search history.

(56) References Cited

U.S. PATENT DOCUMENTS 4,785,317 A 11/1988 Tomoyori et al.
4,970,661 A 11/1990 Tsuzuki et al.
5,438,435 A * 8/1995 Lawniczak .................. 358/496
5,550,572 A * 8/1996 Chang et al. ................ 347/171
5,583,662 A * 12/1996 Takahashi et al. ........... 358/474
5,806,999 A 9/1998 Kobayashi
6,029,969 A * 2/2000 Saitoh et al. ............... 271/4.02
6,103,985 A * 8/2000 Shell et al. .................. 209/587
6,647,239 B2 11/2003 Oberhoffner
7,440,148 B2 * 10/2008 Stemmle et al. ............. 358/474

* cited by examiner

*Primary Examiner*—Negussie Worku
(74) *Attorney, Agent, or Firm*—Rabin & Berdo, P.C.

(57) ABSTRACT

A media transfer mechanism applicable to printers, scanners or multi-function printers is disclosed. The mechanism includes a media-feeding path having at least a pickup roller and a feeding roller for transferring the media to be scanned or printed. Particularly, a block member is installed between the pickup roller and the feeding roller and a little below the feeding roller. Therefore, when the pickup roller reverses to withdraw the media to touch the block member, the media enters a turnover path connected with the media-feeding path. After that, the media transferred by the pickup roller and the feeding roller of the media-feeding path is further processed with the second side scanning or printing.

6 Claims, 3 Drawing Sheets

MEDIA TRANSFER MECHANISM

BACKGROUND OF THE INVENTION

1. Field of the Invention

The invention generally relates to a media transfer mechanism applicable to scanners or printers, and in particular relates to a media transfer mechanism that can handle two-sided operations of the media.

2. Related Art

Scanners and printers are now widely used by individuals and offices for scanning, printing, copying, saving or facsimile of documents. They play very important roles nowadays.

This kind of products, such as fax machines, printers, scanners or multi-function printers (MFP), process at least one side of media. When both sides of media must be scanned, read or printed, in addition to being handled manually, some handling mechanisms incorporated in the machines have been developed. Some related patents are disclosed, such as in U.S. Pat. Nos. 5,550,572, 4,970,661, 4,785,317, 6,647,239 and 5,806,999. Though the mechanisms of prior arts can achieve two-sided media handling in the scanners or printers, they have the same drawbacks of complicated mechanisms that make the machines bulky and the maintenance quite difficult. Also, when transferring the second sides of the media, too many components may easily cause paper jam and wrinkles to the media, which would causes inconvenience to the users.

SUMMARY OF THE INVENTION

The object of the invention is to provide a media transfer mechanism that has simple structure, less components, and reduced size, and can prevent media jam during transfer.

A media transfer mechanism according to the invention is applicable to these kinds of scanners and printers, such as fax machines, printers, scanners and multi-function printers, for handling two-sided scanning or printing operations.

A media transfer mechanism according to the invention includes a media-feeding path having at least a pickup roller, and a feeding roller for transferring the media for scanning or printing. Particularly, a block member is installed between the pickup roller and the feeding roller, and is a little bit below the feeding roller, so that when the feeding roller reverses to withdraw the media to touch the block member, the media enters a turnover path connected with the media-feeding path. Afterwards, the media transferred by the pickup roller and the feeding roller of the media-feeding path is further processed with the second side scanning or printing.

BRIEF DESCRIPTION OF THE DRAWINGS

The invention will become more fully understood from the detailed description given herein below. However, this description is for illustrative purposes only, and thus is not limitative of the invention, wherein.

DETAILED DESCRIPTION OF THE INVENTION

Figure 1:
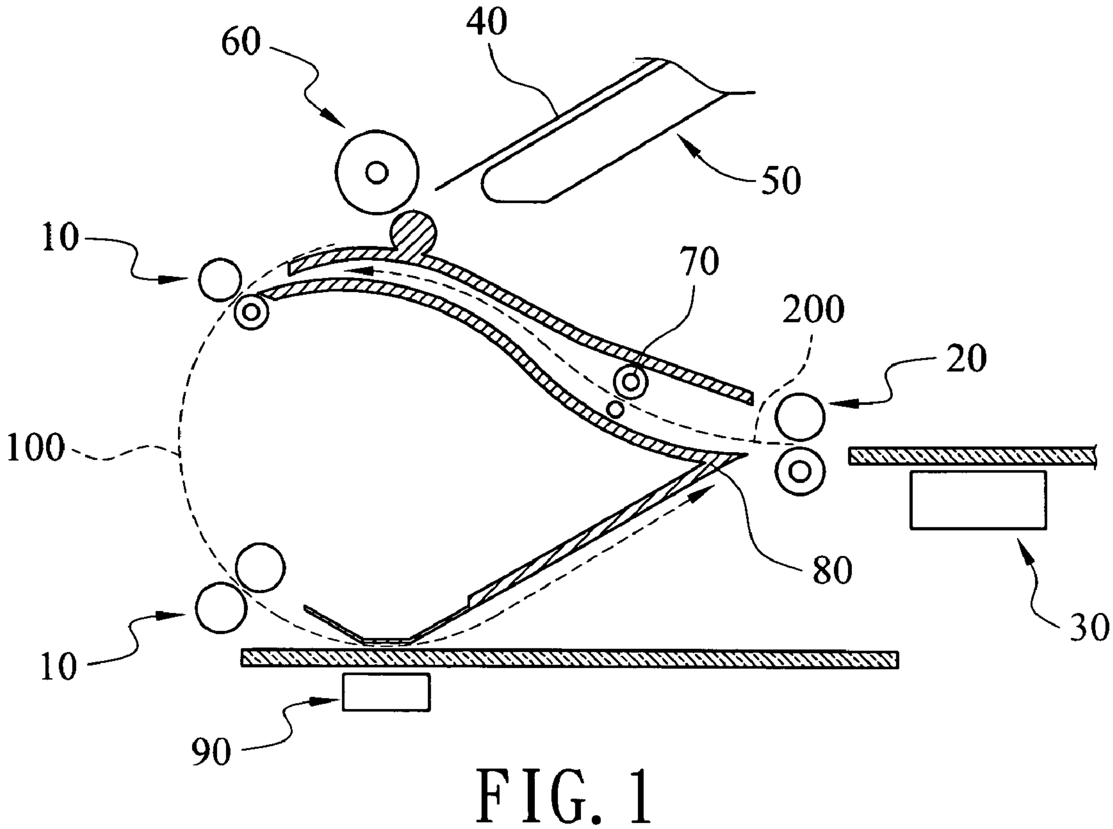
FIGS. 1 to 6 are sequential functional views of a media transfer mechanism of the invention.
Figure 2:
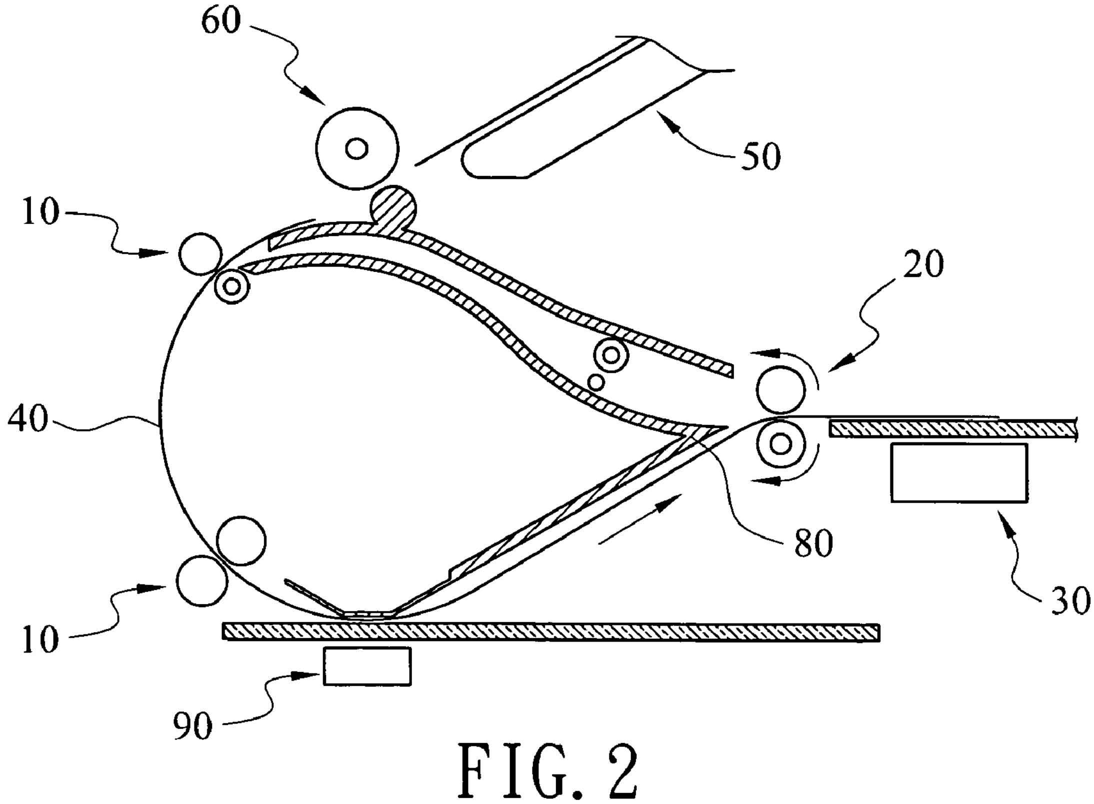

A media transfer mechanism according to the invention is applicable to scanners, printers, or the like. For example, the media transfer mechanism is applied to a scanner, a fax machine, a printer, a copier or a multi-function printer for transferring media 40, such as papers.

FIG. 1 to FIG. 6 are sequential functional views of a media transfer mechanism of the invention. The media 40 are stored in a cartridge 50, and are picked up by a pickup roller 60. In the media-feeding path 100 of the media transfer mechanism of the invention, there are at least a pickup roller 10 and a feeding roller 20. The rollers 10 and 20 are formed with rubber surfaces for getting better friction with the media 40. Please note that the numbers and arrangements of the rollers 10, 20 depend on requirements of functions, and are not limited to that shown in the drawings.

Figure 3:
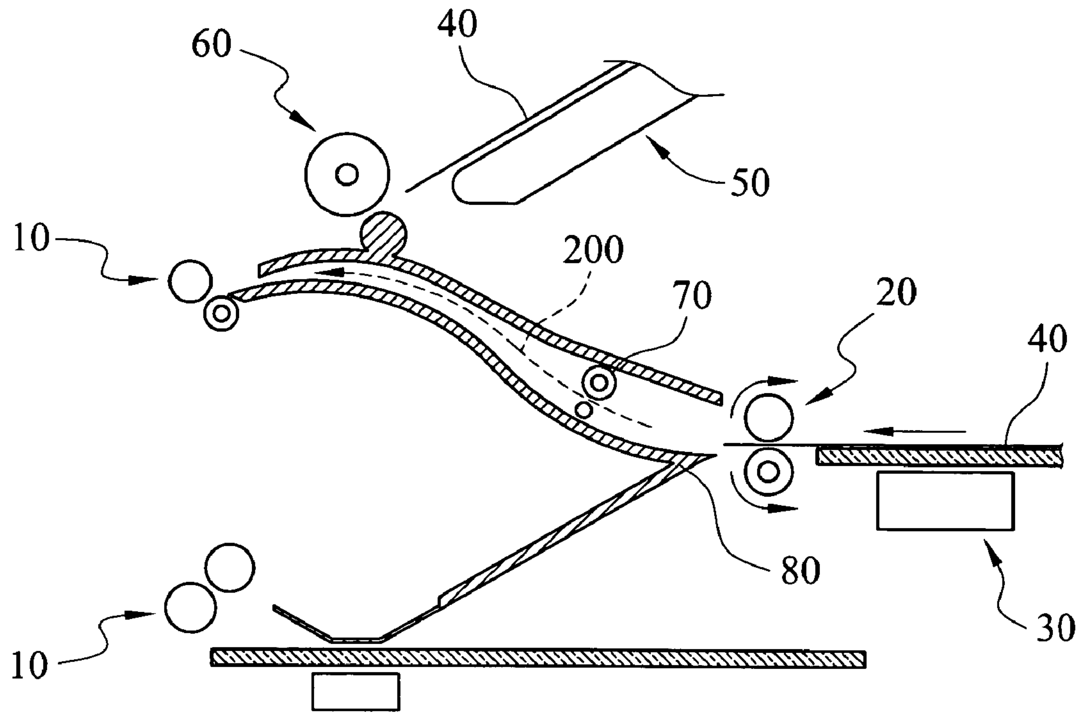

The media 40 are picked up by the pickup rollers 10, and fed by the feeding roller 20 for being further processed by a printing unit 30. For easier descriptions, the front side and back side of the media are defined as first and second sides hereinafter. For example, as shown in FIG. 3, the printing unit 30 prints on the first side of the media 40. A scanning unit 90 is selectively installed in the media-feeding path 100 for scanning the media passing through it.

A block member 80 is installed between the pickup roller 10 and the feeding roller 20, and is a little below the feeding roller 20. The position of the block member 80 is not limited but only depends on the size of the feeding roller 20, and is free from hindering the forward feeding of the media 40 in the media-feeding path 100.

Figure 4:
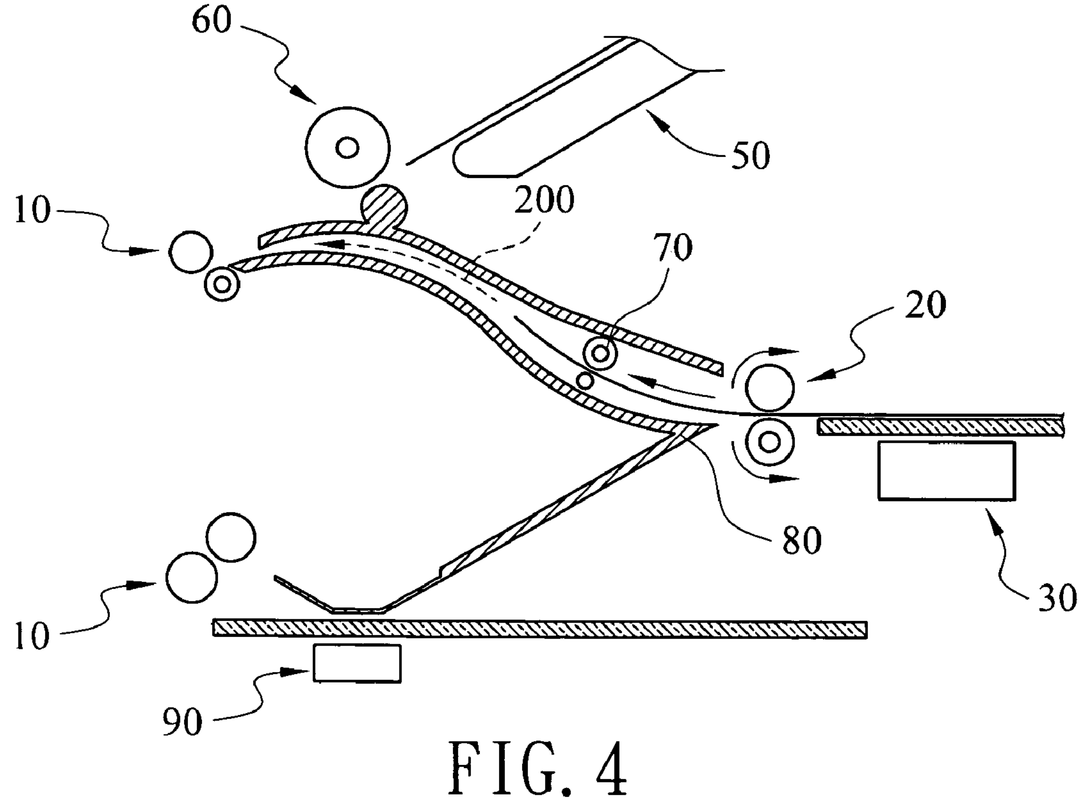

As shown in FIG. 3, after the media 40 is finished with the first side process by the pickup roller 10 and the feeding roller 20, the feeding roller 20 reverses to withdraw the media 40 to touch the block member 80. The media 40 is then guided to a turnover path 200 connected with the media-feeding path 100. As shown in FIG. 4, in order to help the media passing smoothly in the turnover path 200, at least a returning roller 70 is selectively mounted in the path 200 for pushing the media 40 toward the feeding path 100.

Figure 5:
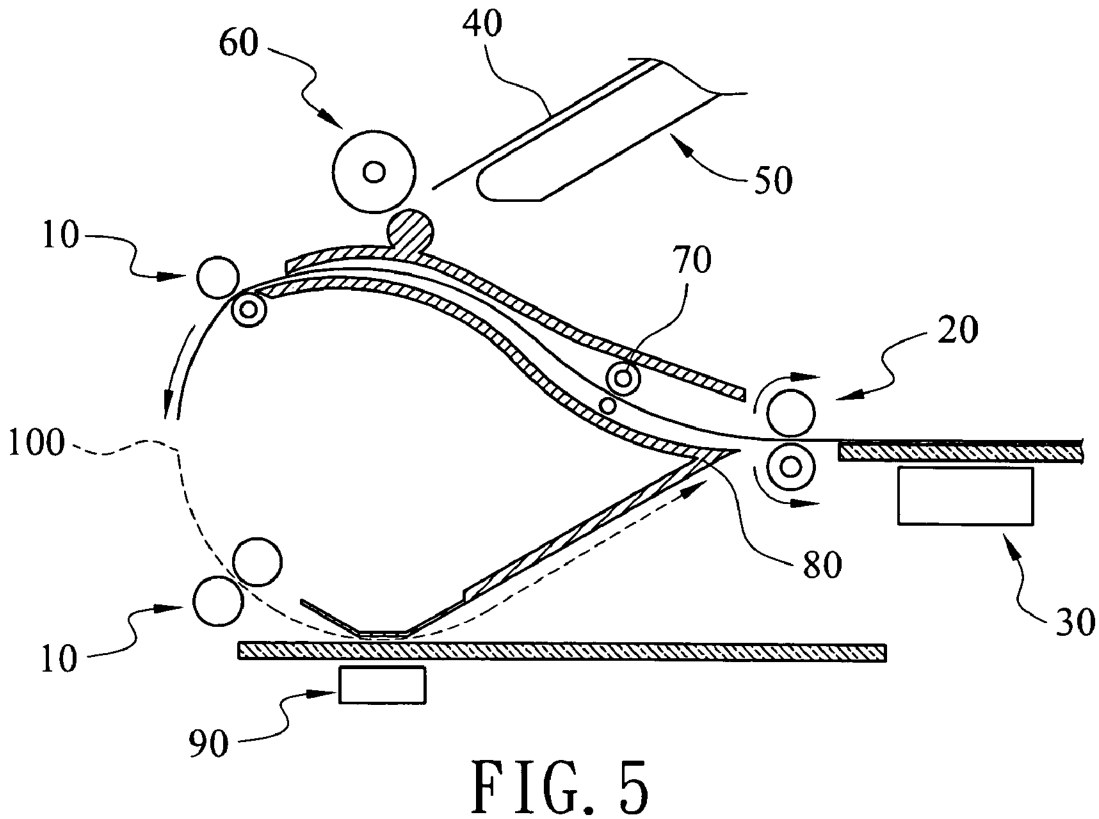
Figure 6:
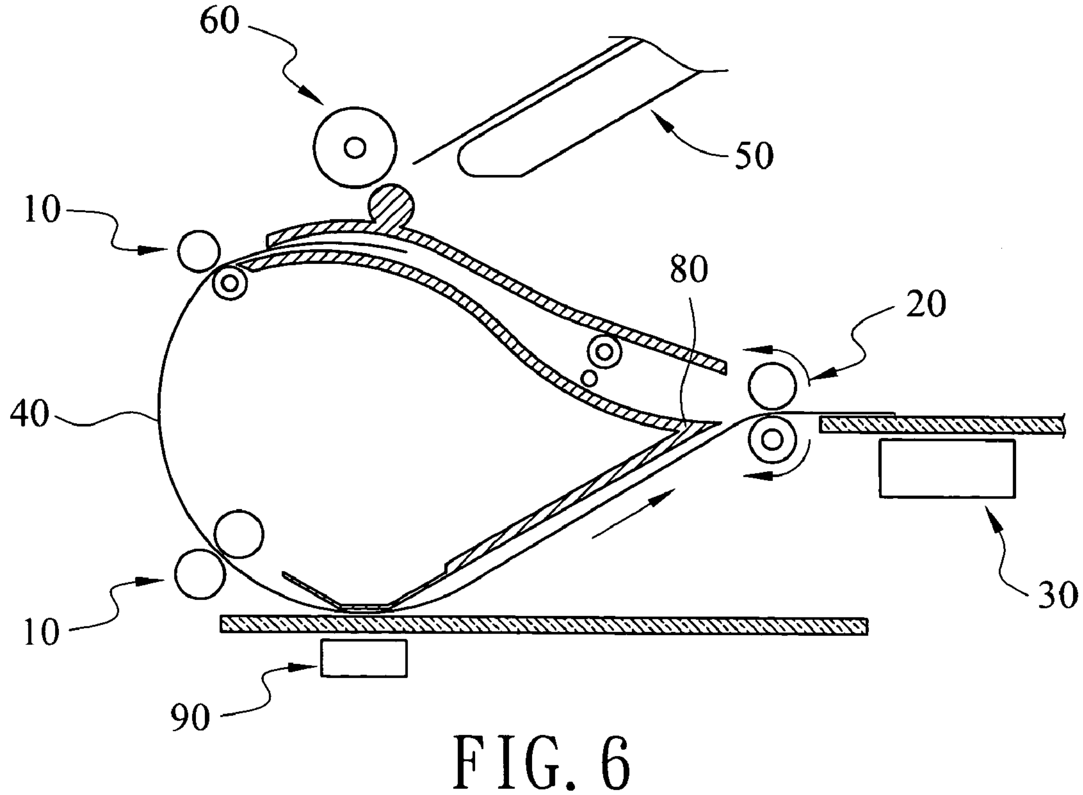

As shown in FIG. 5, after entering the media-feeding path 100, the media 40 is transferred by the pickup roller 10, along the media-feeding path 100, toward the feeding roller 20, and further processed with the second side printing by the printing unit 30, as shown in FIG. 6.

As described above, the media 40 are transferred, along the media-feeding path 100, by the pickup roller 10 and the feeding roller 20, scanned by the scanning unit 90 or printed by the printing unit 30 for the first side, and then reversed by the feeding roller 20, guided along the turnover path 200 by the block member 80, turned over and transferred along the media-feeding path 100 again for being processed with the second side. The mechanism is simple, components are less, size is reduced, maintenance is easy, and the media jam and wrinkles are prevented, therefore, the media transfer mechanism of the invention is inventive and practical.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A media transfer mechanism, applicable to scanners and printers, for transferring media along a loop transferring path consisting of a media-feeding path and a turnover path, said media-feeding path and said turnover path being connected to each other and jointly forming a loop, and processing said media having a first side and a second side, comprising:

- at least a pickup roller in said media-feeding path configured to pick up said media;
- at least a feeding roller disposed in said loop transferring path where said media-feeding path is connected to said turnover path, wherein said feeding roller rotates in a first direction so as to feed said media from said media-feeding path to said scanners and printers, so that a first side of said media is processed by said scanners and printers, and, after said first side is processed, said feeding roller rotates in a second direction opposite to said first direction so as to withdraw said media from said scanners and printers and feed said media to said turnover path; and a block member, mounted between said pickup roller and said feeding roller, and below said feeding roller, for guiding said media withdrawn from said scanners and printers to said turnover path, wherein said media is turned over when said media is transferred to said scanners and printers again along said turnover path and said media-feeding path, so that said second side of said media is processed by said scanners and printers.

2. The media transfer mechanism according to claim 1, wherein said pickup roller is covered with a rubber surface.

3. The media transfer mechanism according to claim 1, wherein said feeding roller is covered with a rubber surface.

4. The media transfer mechanism according to claim 1, wherein said turnover path further includes at least a returning roller for pushing said media toward said media-feeding path.

5. The media transfer mechanism according to claim 1, wherein said media-feeding path includes a scanning unit for scanning said media.

6. The media transfer mechanism according to claim 1, wherein, when said media withdrawn from said scanners and printers is transferred along said loop transferring path and approaches said feeding roller, said feeding roller rotates in said first direction so as to feed said media from said media-feeding path to said scanners and printers.

* * * * *